United States Patent
Hirao et al.

(10) Patent No.: US 10,859,533 B2
(45) Date of Patent: Dec. 8, 2020

(54) PARAMETER ESTIMATION METHOD AND PARAMETER ESTIMATION DEVICE

(71) Applicant: KABUSHIKI KAISHA TOSHIBA, Minato-ku (JP)

(72) Inventors: Akiko Hirao, Kawasaki (JP); Satoshi Takayama, Kawasaki (JP); Tomio Ono, Yokohama (JP); Noriko Yamamoto, Yokohama (JP); Yasuharu Hosono, Kawasaki (JP); Tsuyoshi Kobayashi, Kawasaki (JP); Kazuhiro Itsumi, Koto (JP); Mitsunaga Saito, Inzai (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 281 days.

(21) Appl. No.: 16/126,112

(22) Filed: Sep. 10, 2018

(65) Prior Publication Data
US 2019/0285589 A1    Sep. 19, 2019

(30) Foreign Application Priority Data

Mar. 16, 2018 (JP) ................. 2018-049890
Sep. 4, 2018 (JP) ................. 2018-165349

(51) Int. Cl.
| | |
|---|---|
| G01N 29/12 | (2006.01) |
| G01N 29/46 | (2006.01) |
| G01M 1/12 | (2006.01) |
| G01G 9/00 | (2006.01) |
| G06K 9/00 | (2006.01) |
| G01G 3/16 | (2006.01) |

(52) U.S. Cl.
CPC ............. *G01N 29/12* (2013.01); *G01G 3/16* (2013.01); *G01G 9/00* (2013.01); *G01M 1/122* (2013.01); *G01N 29/46* (2013.01); *G06K 9/00624* (2013.01); *G01N 2291/0289* (2013.01)

(58) Field of Classification Search
CPC combination set(s) only.
See application file for complete search history.

(56) References Cited

U.S. PATENT DOCUMENTS

| | | | |
|---|---|---|---|
| 8,483,942 B2 | 7/2013 | Watanabe | |
| 9,459,238 B1 * | 10/2016 | Konopka | F42D 1/05 |
| 2012/0010851 A1 * | 1/2012 | Mintz | G01G 19/021 |
| | | | 702/173 |
| 2015/0034396 A1 * | 2/2015 | Tchertkov | G01G 3/16 |
| | | | 177/1 |

FOREIGN PATENT DOCUMENTS

| | | |
|---|---|---|
| JP | 4517107 | 8/2010 |
| JP | 2010-210296 | 9/2010 |
| JP | 5798420 | 10/2015 |
| JP | 2017-53719 | 3/2017 |

* cited by examiner

*Primary Examiner* — Jennifer E Simmons
(74) *Attorney, Agent, or Firm* — Oblon, McClelland, Maier & Neustadt, L.L.P.

(57) ABSTRACT

A parameter estimation method, comprises: acquiring appearance information including a shape information and a position information of at least one package; vibrating the at least one package at least at one position selected in accordance with the appearance information, and acquiring at least one data showing a vibration of the at least one package, and estimating a value of at least one parameter of the at least one package in accordance with a relation between the at least one data and the at least one parameter.

12 Claims, 16 Drawing Sheets

SAMPLE A

SAMPLE B

US 10,859,533 B2

PARAMETER ESTIMATION METHOD AND PARAMETER ESTIMATION DEVICE

CROSS REFERENCE TO RELATED APPLICATION

This application is based upon and claims the benefit of priority from Japanese Patent Applications No. 2018-049890, filed on Mar. 16, 2018 and No. 2018-165349, filed on Sep. 4, 2018; the entire contents of which are incorporated herein by reference.

FIELD

Embodiments described herein relate generally to a parameter estimation method and a parameter estimation device.

BACKGROUND

At a site of a distribution industry or the like, miscellaneous packages are transferred by using a robot. There are various parameters such as a size, a shape and a material of a package, and a weight and a position of a gravity center of the package are also various. Accordingly, when the package is gripped with a device such as a robot hand and a drone, a gripping plan including a position to be gripped or the like is created in accordance with image information acquired by a camera or the like. When the gripping is performed in accordance with the gripping plan, there is a case when the gripping fails or the package is broken due to a mistake in recognition regarding a range of an integrated package, or because the weight and the gravity center are unknown.

A plurality of packages integrally disposed with an adhesive, a vinyl wrap, and the like are difficult to be recognized that they are not individual packages but integrated from the image information. Even if existence of the plurality of packages is recognized when it is seen from above, the packages cannot be transferred one by one when they are integrated, and the plurality of packages have to be lifted all at once. In such a case, the gripping is likely to fail if it cannot be recognized that the plurality of packages are integrated. Accordingly, it is necessary to estimate the weight or the gravity center when the gripping plan of the package is created, and to perform the gripping in consideration of the parameters.

However, it is difficult to estimate a weight and a gravity center of a content only through a visual check of a corrugated carton. In particular, it is difficult to estimate a weight and a gravity center of an integrated packing matter because they may differ depending on the weight and the gravity center of each package.

The weight and the gravity center of the plurality of packages which are integrated are preferably estimated through a non-contact inspection. An example of a non-contact device detecting the above-stated parameters includes, for example, an X-ray inspection device, or the like. However, when the weight and the gravity center position are estimated by using an X-ray transmission image, the package has to be put into the X-ray inspection device. Though a throughput of packages per a unit time is huge at a distribution site or the like, the throughput decreases in a case when the above-described method is used. In addition, the X-ray inspection device is expensive, large-sized, and may have a damaging effect on human bodies.

DETAILED DESCRIPTION

A parameter estimation method, comprises: acquiring appearance information including a shape information and a position information of at least one package of a plurality of packages each having a packing material and a content packed by using the packing material; vibrating the at least one package at least at one position selected in accordance with the appearance information, and acquiring at least one data showing a vibration of the at least one package, the at least one data being selected from the group consisting of acceleration, speed and displacement; and estimating a value of at least one parameter of the at least one package in accordance with a relation between the at least one data and the at least one parameter, the at least one parameter being selected from the group consisting of: a weight of the content; a weight of the at least one package; a gravity center of the content; a gravity center of the at least one package; a range of two or more of the contents integrally disposed; a range of two or more of the packages integrally disposed; an adhesive condition of two or more of the contents; and an adhesive condition of two or more of the at least one packages.

The following explains embodiments with reference to the drawings. The drawings are schematic, and for example, sizes such as a thickness and a width of each component may differ from sizes of actual components. In each embodiment, substantially the same components are denoted by the same reference signs and an explanation thereof will be omitted in some cases.

Figure 1:
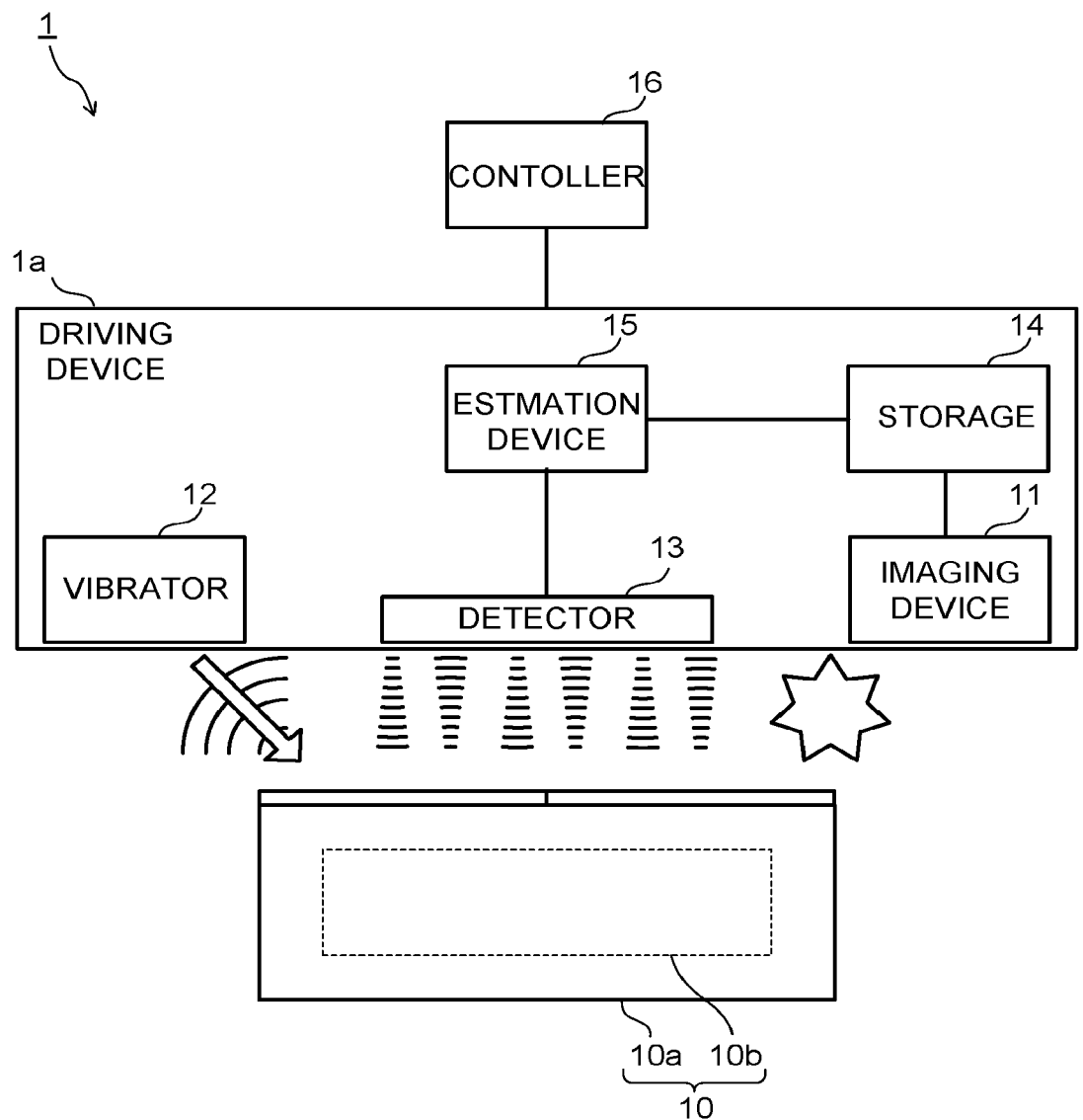
FIG. 1 is a schematic view illustrating a configuration example of an estimation device.

FIG. 1 is a schematic view illustrating a configuration example of a parameter estimation device. An estimation device 1 illustrated in FIG. 1 is able to estimate a value of at least one parameter, which is selected from the group consisting of: a weight of a content; a weight of a package; a gravity center of the content; a gravity center of the package; a range of the contents integrally disposed; a range of the packages integrally disposed; an adhesive condition of two or more of the contents with each other; and an adhesive condition of two or more of the packages with each other, of a package 10 by using a driving part 1a, and includes an imaging device 11, an vibrator 12, a detector 13, a storage 14, an estimation device 15, and a control part 16. The estimation device 1 is used to design, for example, a gripping plan of a package.

The package 10 has a packing material 10a and a content 10b packed with the packing material 10a. An example of the packing material 10a includes, for example, a corrugated carton, or the like, but it is not limited thereto. An example of the content 10b is not particularly limited as long as it can be packed with the packing material 10a. A shape of the package 10 is not also limited to a rectangular parallelepiped shape. The package 10 may be one of packing matters where a plurality of packages is integrated.

The adhesive condition of two or more of the packages with each other or the contents with each other is decided by a state of another package or content which is not gripped when one package or content is gripped to be lifted. When another package or content which is not gripped is lifted together with one package, it is decided that the packages with each other or the contents with each other adhere, a degree of adherence is stronger than a reference, or strength of adherence is higher than a reference, and when another package or content is not lifted, it is decided that they do not adhere, the degree of adherence is weaker than the reference, or the strength of adherence is lower than the reference. For example, a case when a plurality of corrugated cartons partially adhere with a tape, an adhesive, and the like is discriminated. If the cartons are integrally lifted when a part thereof is gripped, it is decided that they adhere, the degree of adherence is stronger than the reference, or the strength of adherence is high. When a plastic bag is used as the packing material, and a plurality of contents are contained therein, and if the plurality of contents are integrally lifted when a part of the plurality of contents is gripped, it is decided that the plurality of contents adhere with the tape, the adhesive, and the like, the degree of adherence is stronger than the reference, or the strength of adherence is high.

The imaging device 11 in FIG. 1 is able to capture an image of the package 10. Appearance information including a shape and a position of the package 10 can be thereby acquired. The imaging device 11 includes, for example, an imaging element such as a camera.

The vibrator 12 is able to excite the package 10. The vibrator 12 has a sonic oscillator such as, for example, an annular array having a ring-shaped vibrator which is concentrically located in order to vary a focal position, an ultrasonic array and an ultrasonic phased array each having a plurality of vibrators which are arranged side by side on a curvature. The ultrasonic array is able to effectively excite a target because sound pressures from a plurality of pieces of vibrators are overlapped. The ultrasonic phased array is able to generate an acoustic radiation pressure. Breakage of the package 10 due to vibration can be suppressed by using these sonic oscillators because non-contact vibration of the package 10 is possible.

The detector 13 is able to acquire data showing a vibration or a change due to the vibration of the package 10. The detector 13 has at least one sensor selected from the group consisting of: for example, an electrostatic capacitance type non-contact displacement meter; an eddy-current type non-contact displacement meter; an optical non-contact displacement meter; an ultrasonic displacement meter; and a laser Doppler vibration meter. Breakage of the package 10 due to detection can be prevented by using a sensor capable of performing non-contact detection. The aforementioned plurality of sensors may be combined. The optical non-contact displacement meter is suitable for the detection of displacement at a relatively distant place, has high detection accuracy, and fast response speed, and so on. The ultrasonic displacement meter is suitable for the detection of displacement at a nearer place than the optical meter with low frequency, unlikely to be affected by a material and a color of the package 10, and less affected by dust and water.

The storage 14 is able to store, for example, a lookup table (LUT). The LUT shows a relation between, for example, the above-stated at least one parameter and the above-stated at least one data. The storage 14 has, for example, a memory. The storage 14 may store data such as the appearance information and a vibration point. The storage 14 does not necessarily store the LUT.

The estimation device 15 is able to process the data and refer to the LUT stored in the storage 14 to estimate a value of the parameter corresponding to the acquired data.

The control part 16 is electrically connected to each of the imaging device 11, the vibrator 12, the detector 13, the storage 14 and the estimation device 15, and outputs a control signal to each part. The control part 16 controls operations of each of the imaging device 11, the vibrator 12, the detector 13, the storage 14, and the estimation device 15 by the control signal. The control part 16 may control the operations by being connected to at least one of the imaging device 11, the vibrator 12, the detector 13, the storage 14, and the estimation device 15.

The estimation device 15 and the control part 16 each may be constituted by hardware using, for example, a processor or the like. Each operation may be executed by storing each operation to a computer-readable storage medium such as a memory as an operation program, and appropriately reading the operation program stored in the storage medium by the hardware.

Figure 2:
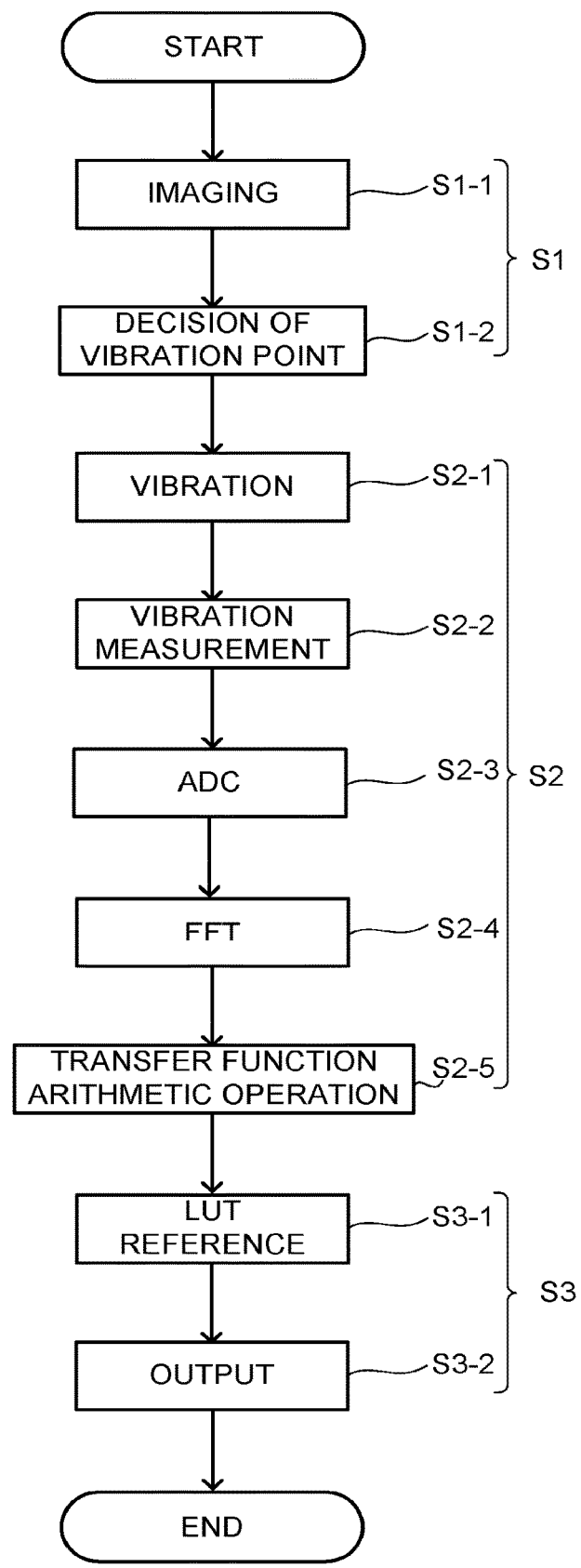
FIG. 2 is a flowchart to explain an estimation method example.

Next, an example of a parameter estimation method of the package 10 by using the estimation device 1 is described with reference to FIG. 2. FIG. 2 is a flowchart to explain an example of the parameter estimation method.

The parameter estimation method example illustrated in FIG. 2 includes an appearance information acquisition step S1, a data acquisition step S2, and a parameter estimation step S3.

The appearance information acquisition step S1 includes an imaging step S1-1 where the package 10 is image-captured by the imaging device 11, and at least one appearance information between the shape and the position of the package 10 is acquired, and an vibration point decision step S1-2 where an exciting position of the package 10 is decided in accordance with the appearance information.

The data acquisition step S2 includes an vibration step S2-1 where the package 10 is vibrated at least at decided one exciting position, and a vibration measurement step S2-2 where at least one data selected from the group consisting of:

acceleration; speed; and displacement of the package 10 and showing a vibration of the package 10 is acquired. A fast Fourier transformation (FFT) step S2-4 where a fast Fourier transformation of the data is performed by the estimation device 15 and a transfer function arithmetic operation step S2-5 where the data after the fast Fourier transformation is converted into a transfer function may further be included after a step S2-3 where the data is analog-digital converted (analog-digital conversion: ADC) as illustrated in FIG. 2. The vibration step S2-1 and the vibration measurement step S2-2 may be performed at each of a first surface and a second surface of the package 10. The exciting position and a data acquisition position may not necessarily coincide.

Figure 3:
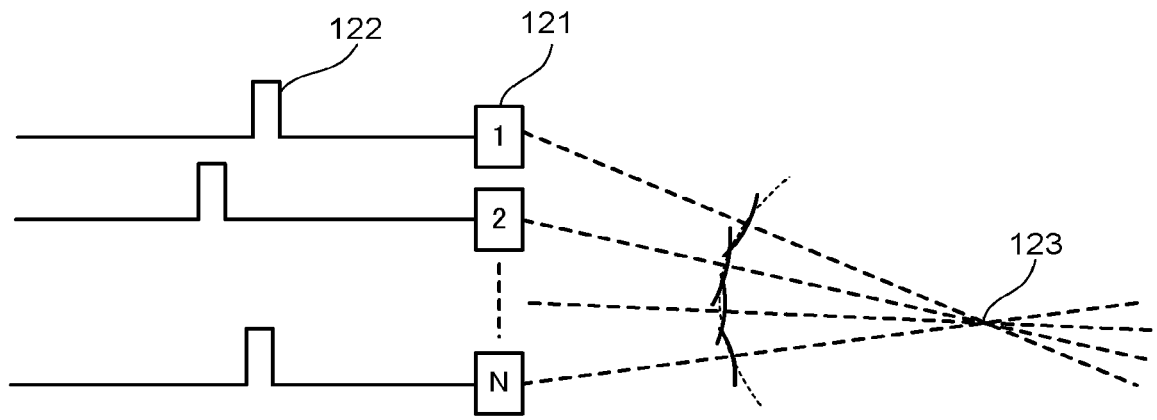
FIG. 3 is a view to explain a principle of an ultrasonic phased array.

There is described a case when impulse vibration is performed for the package 10 by an acoustic radiation pressure of ultrasonic waves propagating in the air by using the ultrasonic phased array in the vibration step S2-1. FIG. 3 is a view to explain a principle of the ultrasonic phased array. In the ultrasonic phased array, N-pieces of ultrasonic oscillators 121 are controlled by drive signals 122. Drive phases of the N-pieces of ultrasonic oscillators 121 are controlled such that phases from all of the ultrasonic oscillators 121 are the same at a position to be vibrated, resulting in that a focused ultrasonic beam is formed at the position to be vibrated (a position 123). The acoustic radiation pressure is in proportion to the square of an amplitude of the ultrasonic wave, resulting in that the acoustic radiation pressure becomes $N^2$ when the number of ultrasonic oscillators 121 of the phased array is N-pieces.

When the package 10 is vibrated in a non-contact manner by using the ultrasonic phased array, a vibration according to the vibration is vibrated at a surface of the package 10. At this time, a frequency and an amplitude of the vibrated vibration differ depending on a weight of a content in the package 10, a position of a gravity center which is defined according to the position of the content, further, a structure, a material, and so on of the package.

There are various shapes and combinations as the ultrasonic array oscillator, and they are appropriately selected according to a shape, an installation location, and so on of the package 10 to be vibrated. For example, the annular array may be used. When the annular array is used, a pulse of the drive signal 122 is sequentially applied from the ultrasonic oscillator 121 at an outside toward the ultrasonic oscillator 121 at a center. The focused ultrasonic beam is thereby formed at the position to be vibrated (the position 123). At this time, a linear array which can focus on only one dimension and the annular array where phases are converged on two dimensions are combined to synthesize acoustic energy.

In the vibration measurement step S2-2, the detector 13 acquires at least one data which is acquired by exciting the package 10, selected from the group consisting of: the acceleration; the speed; and the displacement of the package 10, and shows the vibration of the package 10.

Figure 4:
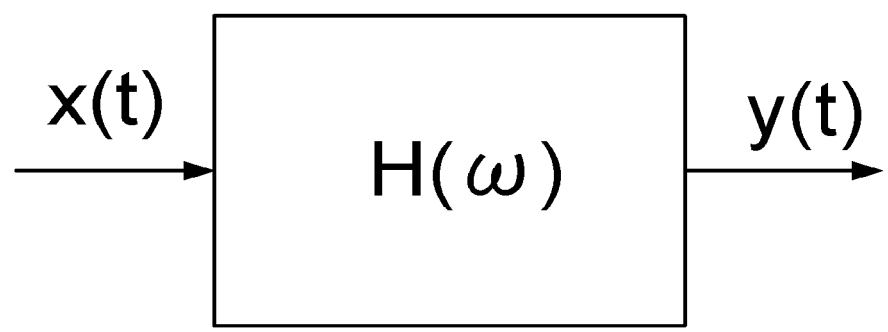
FIG. 4 is a schematic view to explain a transfer function.

Next, the FFT step S2-4 and the transfer function arithmetic operation step S2-5 are described. When vibration analysis is performed, a transfer function (it is also called a frequency response function) $H(\omega)$ changes depending on the weight and the position of the content 10b in the package 10. Here, the transfer function $H(\omega)$ is described. FIG. 4 is a schematic view to explain a transfer function. The transfer function is a function which converts an input x(t) to a system into an output y(t) as illustrated in FIG. 4. An input-output system of a vibration system is represented by a convolution integral illustrated by an expression (1).

[Mathematical expression 1]

$$y(t)=\int_{-\infty}^{\infty}x(\tau)h(t-\tau)d\tau \qquad \text{expression (1)}$$

Where (t) is an vibration force, y(t) is an output (acceleration), and h(t) is an impulse response. Here, a time-invariant linear system is assumed. The Fourier transformation is performed in the FFT step S2-4, resulting in that an expression (2) can be obtained.

[Mathematical expression 2]

$$Y(\omega)=X(\omega)H(\omega) \qquad \text{expression (2)}$$

The transfer function $H(\omega)$ is represented by an expression (3).

[Mathematical expression 3]

$$H(\omega) = \frac{Y(\omega)}{X(\omega)} = \frac{Y(\omega)X(\omega)*}{X(\omega)X(\omega)*} = \frac{C_{xy}(\omega)}{P_{xx}(\omega)} \qquad \text{expression (3)}$$

Where $C_{xy}(\omega)$ is a cross spectrum, $P_{xy}(\omega)$ is an input power spectrum. Further, a function formed of a gain (amplitude) and a phase is obtained such as an expression (4) by using a complex notation of $Y(\omega)=c+id$, $X(\omega)=a+ib$, $X(\omega)*=a-ib$.

[Mathematical expression 4]

$$H(\omega) = \frac{(ac+bd)+i(ad-bc)}{(a^2+b^2)} \qquad \text{expression (4)}$$

In the transfer function arithmetic operation step S2-5, the transfer function composed of the gain (amplitude) and the phase is calculated by using the expression (4) from the amplitude and the frequency of a vibration mode of the vibration.

The parameter estimation step S3 includes a LUT reference step S3-1 and an output step S3-2.

In the LUT reference step S3-1, the obtained transfer function is collated with the LUT shoving a relation between the transfer function and the weight or the gravity center of the package 10 which is acquired in advance. In the output step S3-2, values of parameters relating to the weight of the package, the gravity center, the range of two or more of the packages integrally disposed, the adhesive condition of two or more of the packages with each other or the contents with each other which are the most probable corresponding to the transfer function are output as data. An optimum LUT is selected according to an application target. For example, the LUT may use the output data in itself from the detector 13, or may use the transfer function generated by converting the output data. The LUT may be created by previously acquiring the data by using a plurality of packages whose parameter values are already known. The LUT may be created by storing data such as the appearance information and the exciting position of the package 10 in the storage 14.

Another example of a parameter estimation method of the package 10 using the estimation device 1 is described with reference to FIG. 22. FIG. 2 is a flowchart to explain an example of the parameter estimation method. The explanation of FIG. 2 can be appropriately used for the parts which are the same as the parameter estimation method illustrated in FIG. 2.

Figure 22:
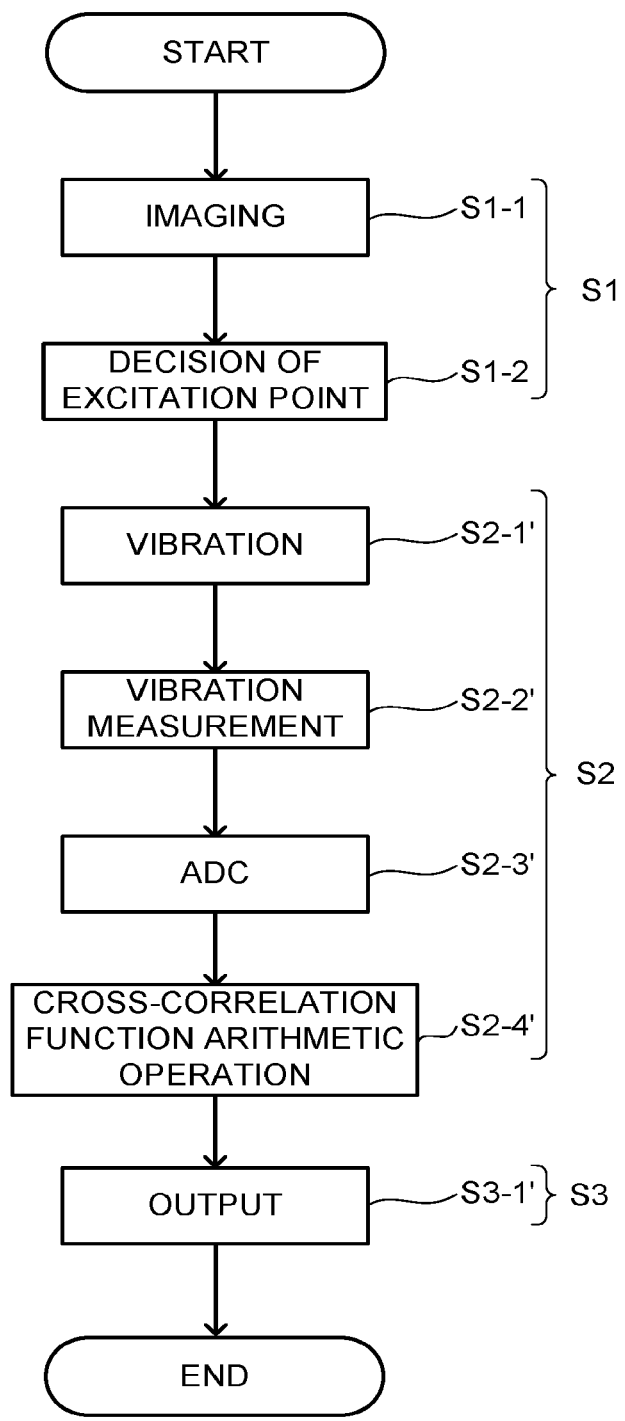
FIG. 22 is a flowchart to explain another example of an estimation method.

The parameter estimation method example illustrated in FIG. 22 includes the appearance information acquisition step S1, the data acquisition step S2, and the parameter estimation step S3.

The appearance information acquisition step S1 includes the imaging step S1-1 where the package 10 is image-captured by the imaging device 11, and at least one appearance information between the shape and the position of the package 10 is acquired, and the vibration point decision step S1-2 where the exciting position of the package 10 is decided in accordance with the appearance information.

The data acquisition step S2 includes an vibration step S2-1' where the package 10 is simultaneously or sequentially vibrated at a plurality of vibration positions including a decided first and second position, and a vibration measurement step S2-2' where a plurality of data including at least one first data selected from the group consisting of: the acceleration; the speed; and the displacement of the package 10 and showing a vibration of the package 10, and at least one second data selected from the group consisting of: the acceleration; the speed; and the displacement of the package 10 and showing the vibration of the package 10 are acquired, a step S2-3' where a plurality of data are analog-digital converted (analog-digital conversion: ADC), and a cross-correlation function arithmetic operation step S2-4' calculating a cross-correlation function.

In the vibration step S2-1', the package 10 is simultaneously or sequentially vibrated at the plurality of exciting positions including the first position and the second position which are decided through the similar method as the vibration step S2-1.

In the vibration measurement step S2-2', the plurality of data including the at least one first data which is acquired by exciting the package 10 at the first position, selected from the group consisting of: the acceleration; the speed; and the displacement of the package 10, and shows the vibration of the package 10 and the at least one second data which is acquired by exciting the package 10 at the second position, selected from the group consisting of: the acceleration; the speed; and the displacement of the package 10, and shows the vibration of the package 10, are acquired. The first data may be acquired at the first surface, for example. The second data may be acquired at the second surface, for example.

In the cross-correlation function arithmetic operation step S2-4', a cross-correlation function of the plurality of data with each other including the first data and the second data is calculated. The cross-correlation function is used to check similarity of two time-series waveforms, and represented as a function of a phase shift time, σ of the two waveforms. When the two waveforms completely match, the result is 1 and when they match with sign inversion, the result is −1, and when they do not completely match, the result is "0" (zero). For example, when data f, g are obtained by the vibration measurement step S2-2', the cross-correlation function is calculated through an expression (5) by using the data f, g.

[Mathematical expression 5]

$$C_{fg}(\sigma) = \lim_{X \to \infty} \frac{1}{X} \int_{-\frac{X}{2}}^{\frac{X}{2}} f(x)g(x+\sigma)dX \quad \text{expression (5)}$$

When an absolute value of this numeric value is close to 1, it can be decided that there is a correlation between two data, and when the value is large, it is highly possible that the contents are integrally disposed. For example, a ease when a package where a plurality pieces of plastic bottles are wrapped with a tape to be integrated correspond thereto. Meanwhile, when a plurality of packages 10 which are each wrapped with a tape to be integrated are arranged, and when a certain package 10 is vibrated and a total two data of a data at one position of a content of the vibrated package 10 and a data at one position of contents which are integrated as another package from the above package 10 are acquired, the cross-correlation function is small. As a result, it is possible to identify the range of the packages 10 which are integrated with a packing material even when the packing material packing each content 10b is difficult to be recognized with a camera or the like.

The parameter estimation step S3 includes an output step S3-1'. In the output step S3-1', a value of at least one parameter selected from the group consisting of: the weight of the content 10b; the weight of the package 10, the gravity center of the content 10b; the gravity center of the package 10; the range of two or more of the contents 10b which are integrated; the range of two or more of the packages 10 which are integrated; the adhesive condition of two or more of the contents 10b with each other; and the adhesive condition of two or more of the packages 10 with each other which is the most probable corresponding to the obtained cross-correlation function is output as data.

The aforementioned estimation method is an example, and the estimation method is not limited thereto. The parameters can be estimated only by previously learning a relation between data such as an amplitude of vibration and duration of vibration which are observed by vibration and at least one parameter selected from the group consisting of: the weight of the content 10b; the weight of the package 10; the gravity center of the content 10b; the gravity center of the package 10; the range of two or more of the contents 10b which are integrated; the range of two or more of the packages 10 which are integrated; the adhesive condition of two or more of the contents 10b with each other; and the adhesive condition of two or more of the packages 10 with each other, as data.

As stated above, the parameter estimation device and the estimation method of the embodiment grasp the appearance of the package and estimate at least one parameter between the weight or the gravity center of the package from a vibration state at one position or more of the package due to vibration. It is possible to simply estimate at least one parameter selected from the group consisting of: the weight of the content 10b; the weight of the package 10; the gravity center of the content 10b; the gravity center of the package 10; the range of two or more of the contents 10b which are integrated; the range of the packages 10 which are integrated; the adhesive condition of two or more of the contents 10b with each other; and the adhesive condition of two or more of the packages 10 with each other by detecting the vibration of the package due to vibration as same as, for example, by observing a state swaying on a moving cart or checking a propagating state or the like of the vibration by directly touching the package, and the like. In addition, breakage of the package can be suppressed because the estimation in the non-contact manner is possible and the package can be transferred by creating the more accurate gripping plan.

EXAMPLES

Example 1

Figure 5:
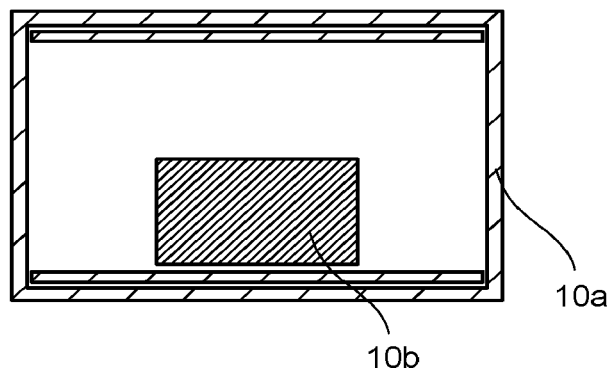
FIG. 5 is a schematic view illustrating a packing example.
Figure 6:
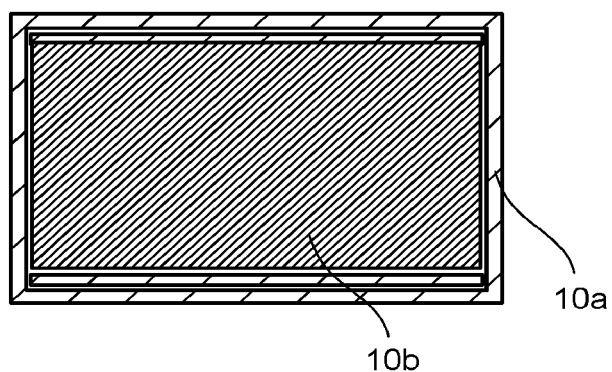
FIG. 6 is a schematic view illustrating a packing example.
Figure 7:
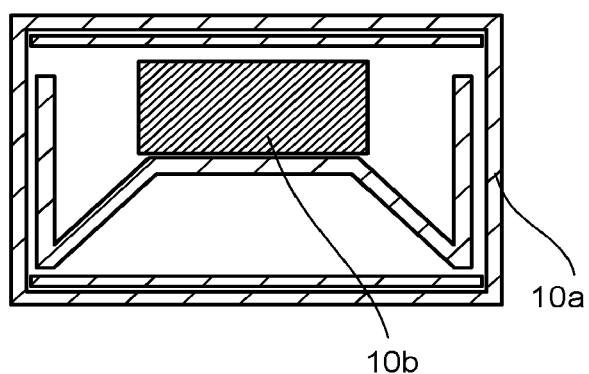
FIG. 7 is a schematic view illustrating a packing example.

There are various packing manners of the content 10b into the packing material 10a, and vibration characteristics differ depending on the packing manners. FIG. 5 to FIG. 7 are schematic views each illustrating a packing example by a corrugated carton. FIG. 5 illustrates a case when a content is put at a bottom of the packing material 10a being the corrugated carton as the content 10b, FIG. 6 illustrates a case when a content is filled into the packing material 10a as the content 10b, and FIG. 7 illustrates a case when the content 10b is fixed at a gravity center of the packing material 10a. At recent distribution sites, the packing manner illustrated in FIG. 7 is often used. Accordingly, the vibrations of the package 10 in the packing manner illustrated in FIG. 6 and the package 10 in the packing manner illustrated in FIG. 7 are examined. The content is fixed with a double-sided adhesive tape in both cases.

Figure 8:
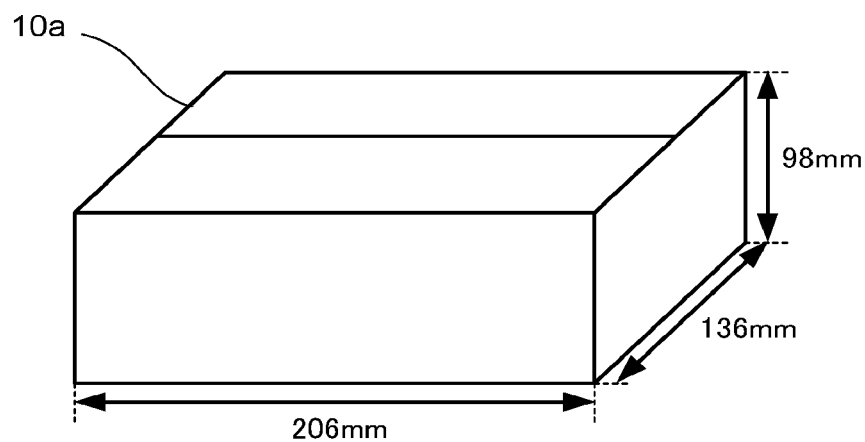
FIG. 8 is a view illustrating an outer shape of a corrugated carton.
Figure 9:
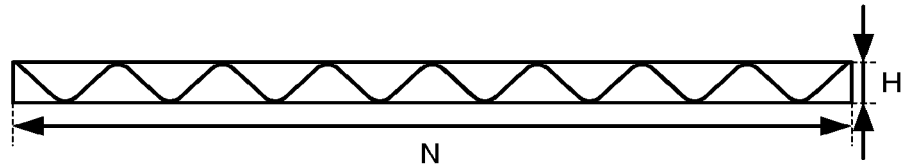
FIG. 9 is a view illustrating a structure of a cross-section of a cardboard which is elements of corrugated carton.
Figure 10:
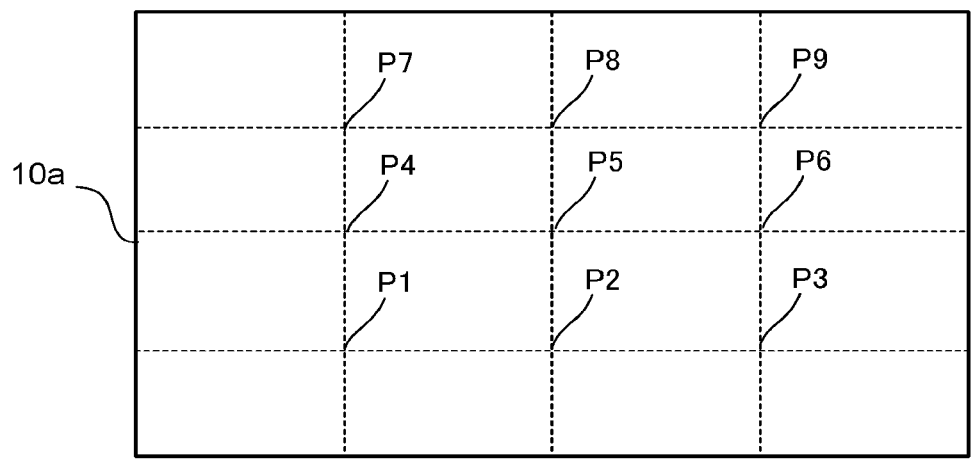
FIG. 10 is a top of view illustrating a vibration point and a vibration mode measurement point of a corrugated carton.

FIG. 8 is a view illustrating an outer shape of a corrugated carton used for the examples, FIG. 9 is a view illustrating a structure of a cross-section of a cardboard which is elements of the corrugated carton, and FIG. 10 is a view illustrating positions P1 to P9 indicating an vibration point and a vibration measurement point of the corrugated carton. The corrugated carton is classified depending on the number of flutes N (flute number N) and a height (thickness) H of the flute as illustrated in FIG. 9. The flute of the corrugated carton used in the examples has the flute number N of 50±2/30 cm, and the thickness H of 3 mm. A size of the box is 185 mm×240 mm×90 mm, and two faces adhere with a gummed tape to form a box shape.

Figure 11:
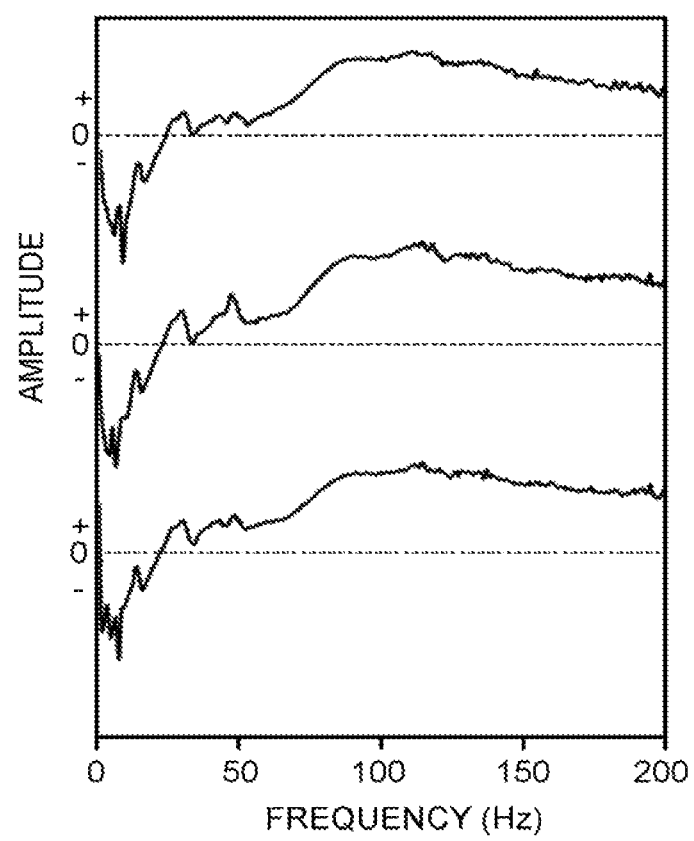
FIG. 11 is a view illustrating a transfer function.
Figure 12:
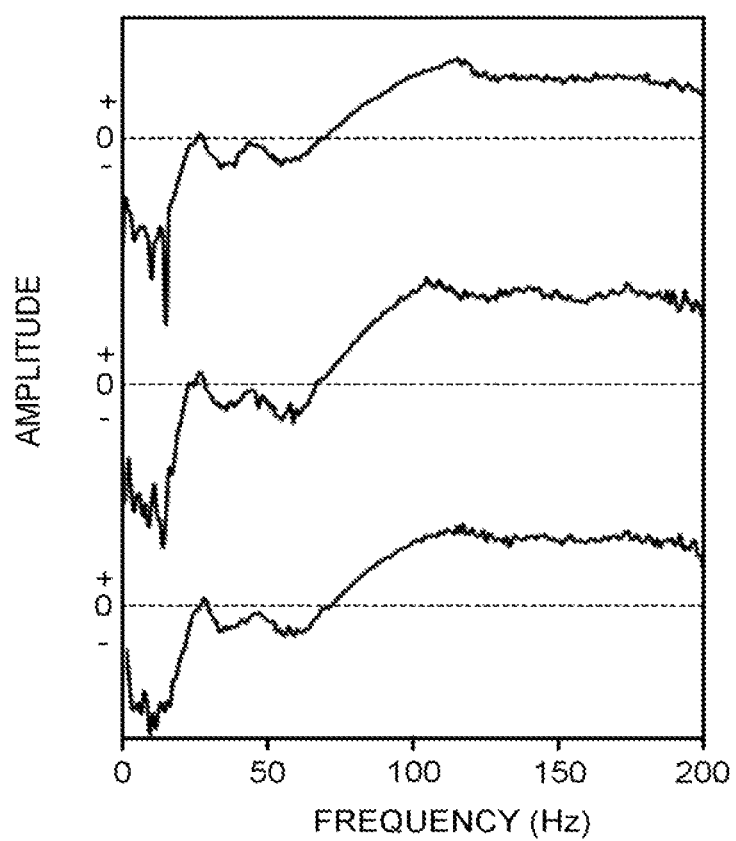
FIG. 12 is a view illustrating a transfer function.

Each case when the content was located at a center position when seen from the above of the corrugated carton was examined in order to examine whether the transfer function changed depending on the weight. The package 10 where the content was located in the packing manner illustrated in FIG. 7 was vibrated with the ultrasonic phased array, the vibration was measured with the optical non-contact displacement meter, and the transfer function was calculated. An aluminum plate with a weight of 171 g was used as the content, and two samples which differ in weight by changing the number of aluminum plates were prepared. The weight of the corrugated carton is 197 g. The transfer function when the vibration point is set to the position P3 and the vibration measurement point is set to the position P5 in FIG. 10 are illustrated in FIG. 11 and FIG. 12. FIG. 11 is a view illustrating the transfer function when the package has a gross weight of 539 g, and FIG. 12 is a view illustrating the transfer function when the package has a gross weight of 885 g.

Figure 13:
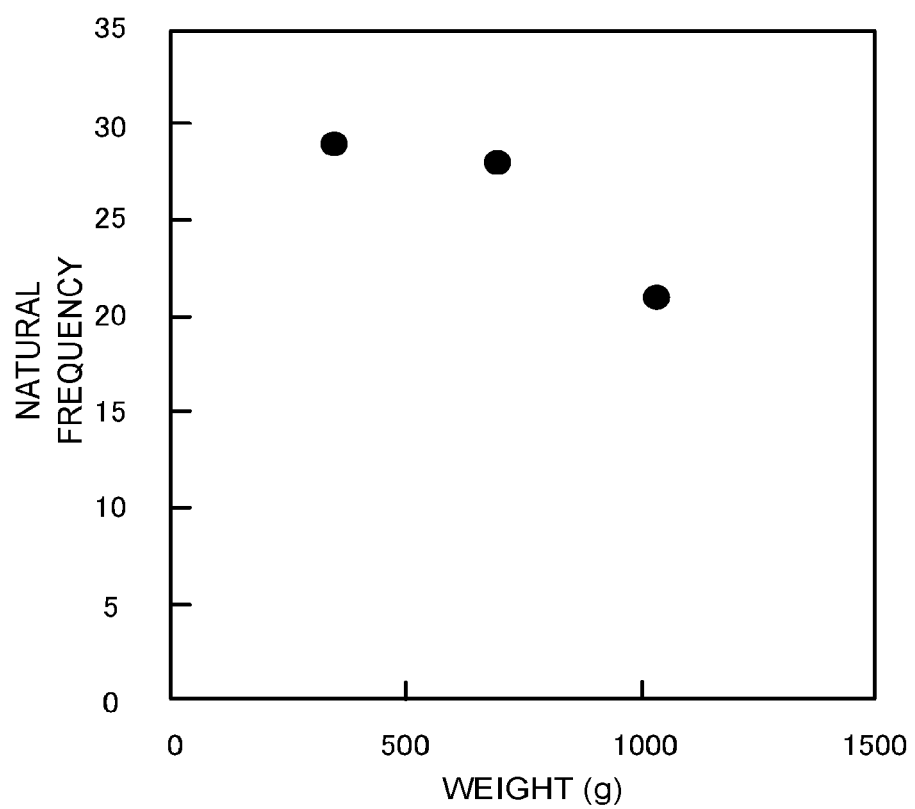
FIG. 13 is a view illustrating a relation between a natural frequency and a weight.
Figure 14:
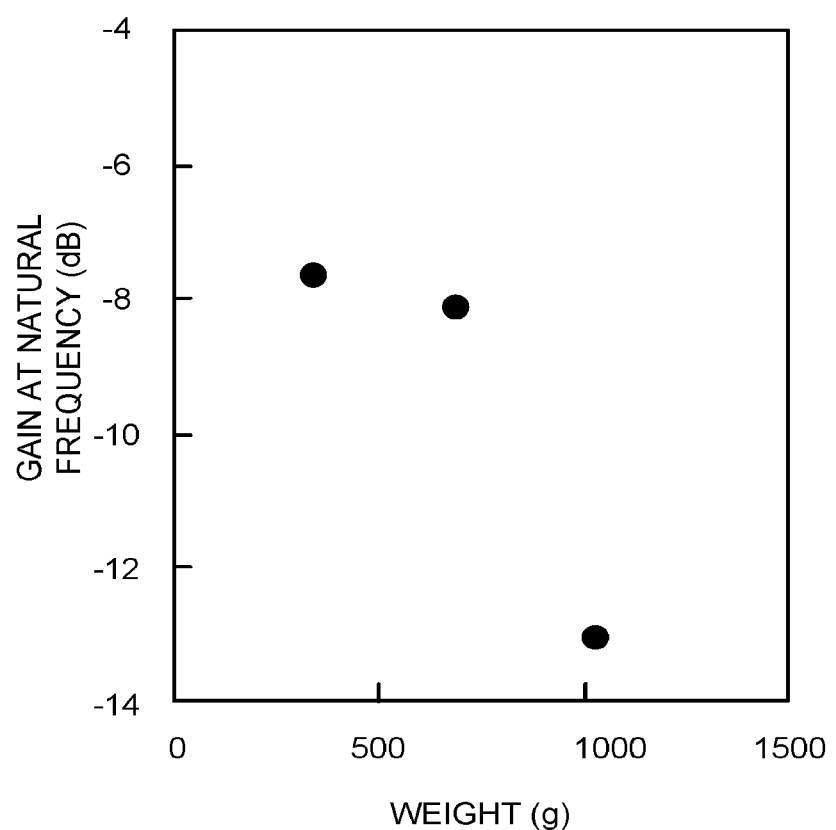
FIG. 14 is a view illustrating a relation between a gain of a natural vibration and a weight.

It can be seen from FIG. 11 and FIG. 12 that the transfer function has reproducibility in a low-frequency region. Though it is possible to perform weight estimation by using data of a whole frequency region of the obtained transfer function, it is simply examined here whether weight estimation is possible by using a vibration frequency which is considered to be a natural frequency where a phase is inverted. Results thereof are illustrated in FIGS. 13, 14. FIG. 13 is a view illustrating a relation between a weight and a vibration frequency, and FIG. 14 is a view illustrating a relation between a weight and a gain of a natural vibration. As it can be seen from FIGS. 13, 14, when the frequency where the phase is inverted is plotted with respect to a gross weight of a corrugated carton, the vibration frequency and the gain where the phase is inverted become low as the content becomes heavier.

Next, a LUT using waveform data of the transfer functions illustrated in FIGS. 11, 12 was stored in the storage in order to examine whether the parameter estimation device and the parameter estimation method actually functioned. Next, the package 10 whose weight was unknown was prepared, and the weight of the package was estimated with a robot hand including the parameter estimation device.

Figure 15:
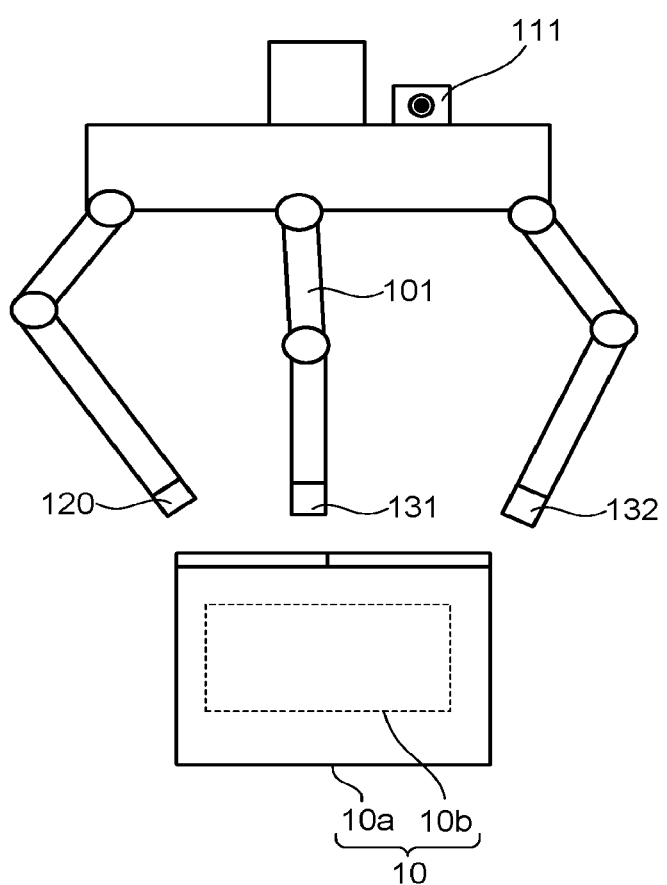
FIG. 15 is a view illustrating a configuration of a robot hand.

FIG. 15 is a view illustrating a configuration of a robot hand. The robot hand illustrated in FIG. 15 has the configuration illustrated in FIG. 1, and includes a camera 111 at the imaging device 11, an ultrasonic phased array 120 provided at a main body 101 at the vibrator 12, and a vibration sensor 131 and a vibration sensor 132 provided at the main body 101 at the detector 13.

The package whose weight was unknown was image-captured with the imaging device 11, and the LUT was selected according to the captured image. The vibration point and the vibration measurement point of the package 10 were decided with reference to the LUT. Next, the robot hand was moved so that the decided vibration point could be vibrated, the vibration was performed with the ultrasonic phased array, and a vibration was simultaneously measured with the optical non-contact displacement meter. The acquired data was analyzed at the estimation device 15, to obtain the transfer function. Next, the weight was estimated with reference to the LUT. The result was extremely good with an error ratio of 10% or less.

Example 2

Figure 16:
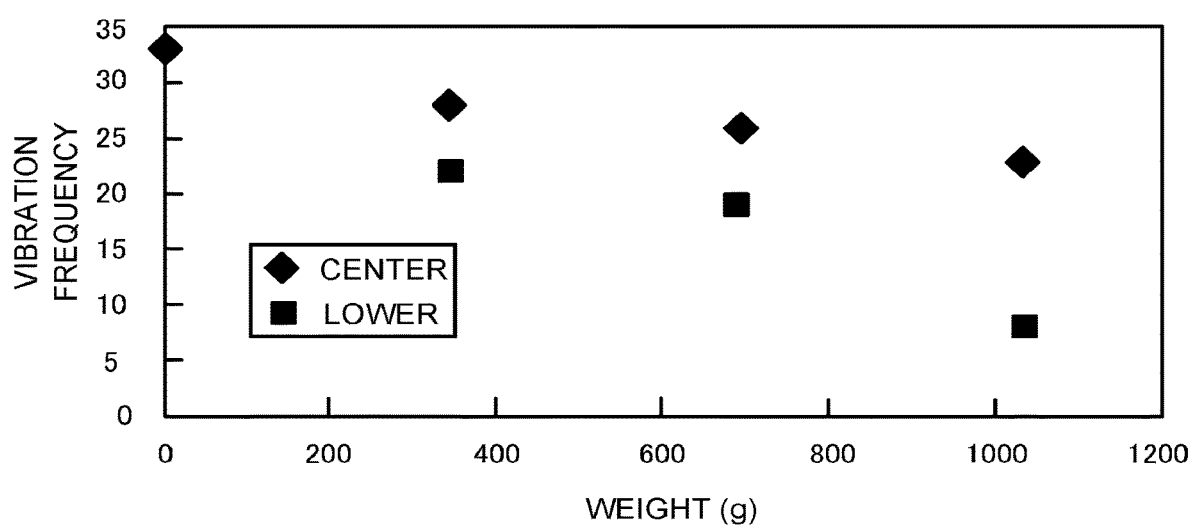
FIG. 16 is a view illustrating a relation between a vibration frequency and a weight.

The vibration of the package 10 was examined regarding a case when a corrugated carton which is the same as Example 1 except that the flute number N was 94±6/30 cm and the thickness H was 1.8 mm was used. FIG. 16 illustrates a relation between the weight and the vibration frequency in each of cases when the content was located at a center part and a lower part of the corrugated carton in the packing manner illustrated in FIG. 6. It can be seen that the vibration frequency becomes small as the content is heavier regardless of the position of the content, and the vibration frequency is small as the position of the content is lower.

The vibration frequencies of the vibration largely differ depending on a position where the content is located in the packing material 10a even if the weights of the packages 10 are the same. Accordingly, it is necessary to measure the vibrations of the package 10 at least at two surfaces in order to estimate the weight more accurately. When the package 10 is vibrated from a side surface, an amplitude of the vibration becomes larger at a surface near an upper part when the content was located at the lower part. The weight of the package 10 whose weight was unknown was estimated through the similar method as Example 1 by acquiring the data at the side surface, then the weight could be estimated with an error ratio of 32% or less.

Example 3

Figure 17:
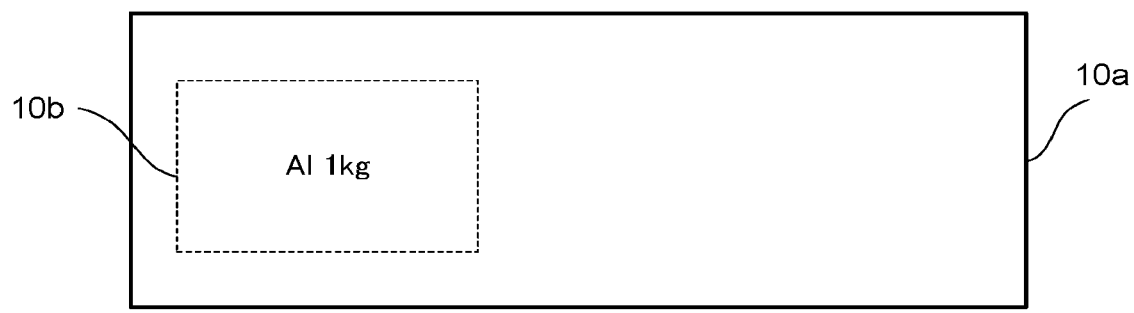
FIG. 17 is a view illustrating a constitution of a package of Sample A.
Figure 18:
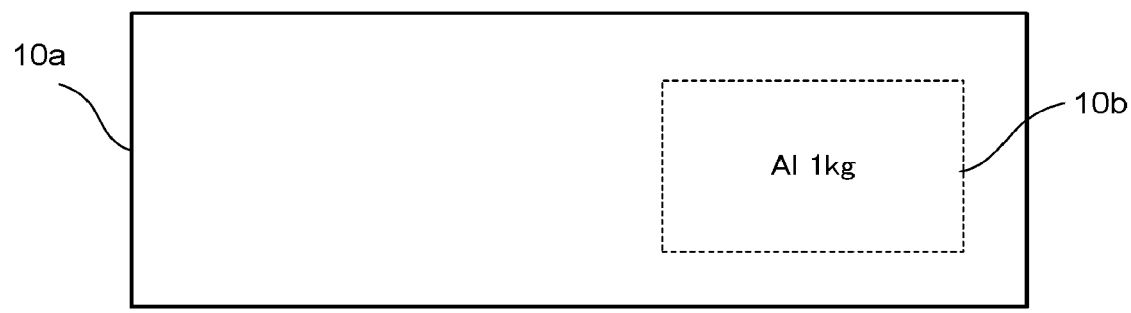
FIG. 18 is a view illustrating a constitution of a package of Sample B.

A change of the transfer function when the gravity center was changed was examined. A used corrugated carton was the same kind as that of Example 1. An aluminum metal block (weight of 1 kg) was located at a bottom part of the corrugated carton. FIG. 17 is a view illustrating a constitution of a package of Sample A, and FIG. 18 is a view illustrating a constitution of a package of Sample B. Sample A and Sample B differ in positions of the contents as illustrated in FIG. 17 and FIG. 18.

The vibrations of the package 10 were measured by finding transfer functions while minutely changing positions of the vibration measurement in order to know how the vibration changes depending on the change in the position of the gravity center.

At an upper surface of Sample A, a longitudinal direction was divided into eight equal parts, a depth direction was divided into quarters, Sample A was vibrated with the ultrasonic phased array regarding cases when respective intersections were set as the vibration measurement points, and the transfer functions were calculated by the estimation device 15. Here, the vibration point was fixed to one point at an upper part corner.

Figure 19:
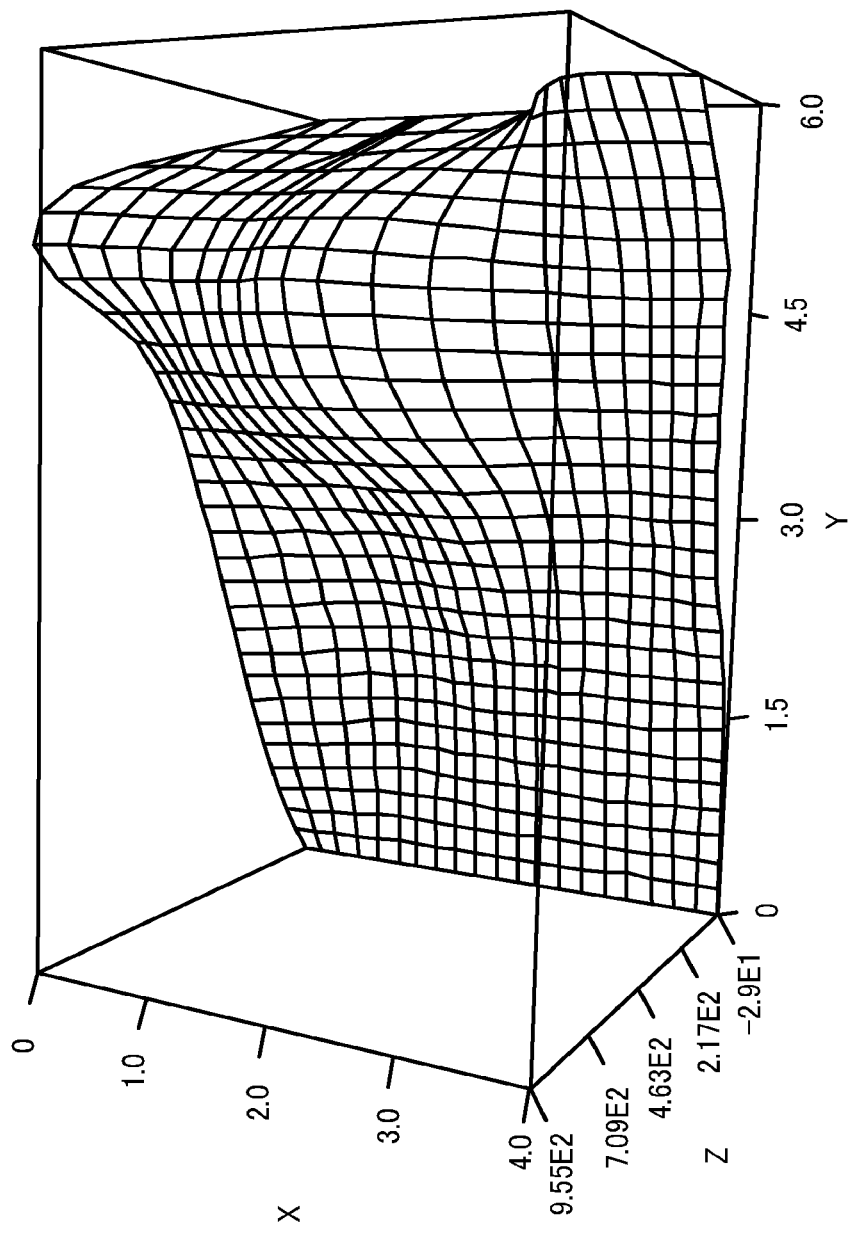
FIG. 19 is a view illustrating a vibration mode.
Figure 20:
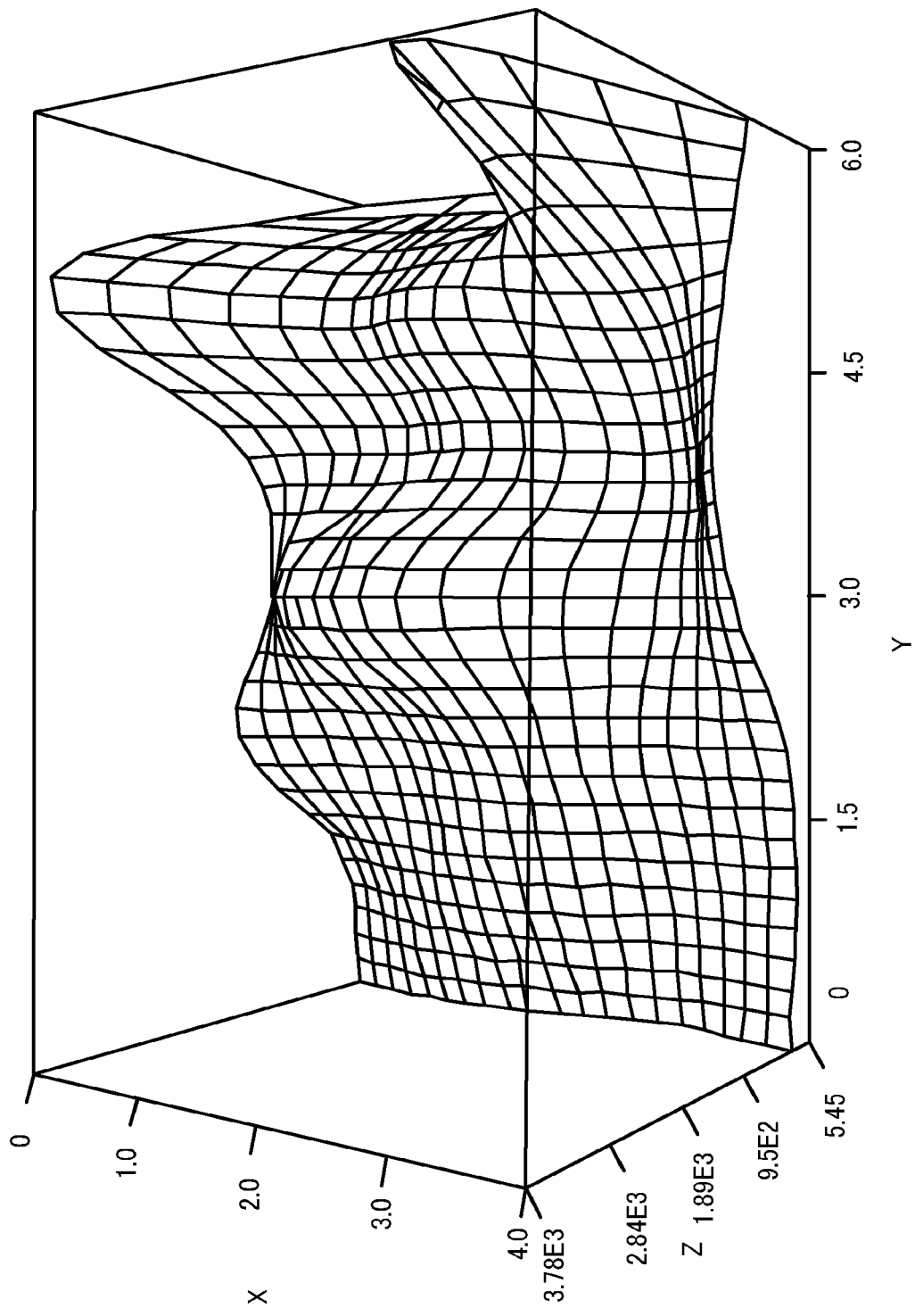
FIG. 20 is a view illustrating a vibration mode.

Amplitudes of a specific frequency among the obtained transfer function were plotted in a two-dimensional image. Here, when the phase of the transfer function was negative, a numeric value of the amplitude was plotted as a negative value. A vibration mode at the frequency of 56 Hz is illustrated in FIG. 19, and a vibration mode at 77 Hz is illustrated in FIG. 20. In each case, a gain (Z-axis) of the vibration was large at a right side where the content was not located, and the gain (Z-axis) was small at a left side where the content was located. The vibration illustrated in FIG. 19 is a "bending vibration mode" where a right side of an upper surface rises, and the vibration illustrated in FIG. 20 is a "twisting vibration mode" where both ends in an X-axis direction at a right side rise. In both cases, the vibration mode at a left side is suppressed due to an effect of the content located at the bottom of the corrugated carton.

On receiving the above results, data similar to the data illustrated in FIG. 19 and FIG. 20 were acquired by locating the content at various places, and the LUT using the data was created to be stored in the storage 14.

Next, a corrugated carton whose gravity center was unknown was prepared, and the gravity center was estimated with the robot hand illustrated in FIG. 15. Namely, the package 10 whose gravity center was unknown was image-captured by the imaging device 11, and the LUT was selected according to the captured image. The vibration point and the vibration measurement point of the package were decided with reference to the LUT. Next, the robot hand was moved so that the decided vibration point could be vibrated, the vibration was performed with the ultrasonic phased array, and the vibration was simultaneously measured with the optical non-contact displacement meter. The acquired data was collated with the LUT to estimate the gravity center, then a position where the gravity center exists could be estimated with a hitting ratio of 100% from among divided four parts from the upper surface of the corrugated carton.

Example 4

Figure 21:
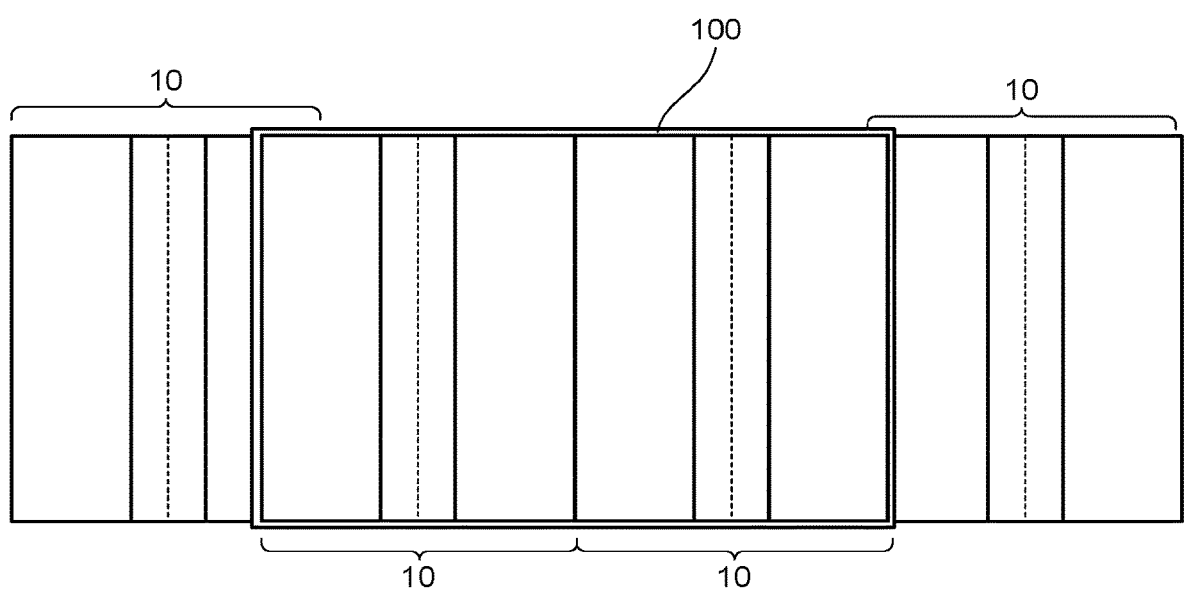
FIG. 21 is an upper surface view illustrating a constitution of a plurality of packages integrally disposed.

It was examined whether the detection was possible when a plurality of packages were integrated with strings, tapes, or the like. FIG. 21 is an upper surface view illustrating a constitution of a plurality of packages which are integrated. In FIG. 21, two packages 10 at a center were integrated with a wrap 100, and the packages 10 at left and right were located at sides of the center packages. It was necessary to pick up the two packages 10 at the center all at once, and it was examined whether the estimation of the weight, the gravity center, the number of packing matters, the adhesive condition of two or more of the contents with each other, and so on was possible through the estimation method of the embodiment.

Similar to Example 3, the gravity center estimation was performed with the robot hand illustrated in FIG. 15. Namely, the package 10 whose gravity center was unknown was image-captured by the imaging device 11, and the LUT was selected according to the captured image. The vibration point and the two vibration measurement points of the package were decided with reference to the LUT. Next, the robot hand was moved so that the decided vibration point could be vibrated, the vibration was performed with the ultrasonic phased array, and the vibration was simultaneously measured with the optical non-contact displacement meter. The acquired data was analog-digital converted, and the cross-correlation function of the two data was examined. As a result, the cross-correlation function when a part of the two packages 10 at the center was vibrated and the vibrations at two positions of the two packages 10 at the center were observed was 0.88. Meanwhile, when one of the vibration measurement points was set to the independent package 10 at left or right, and the cross-correlation function with the data observed at the packages at the center was a small value to be 0.46. When either one of the packages 10 at left and right was vibrated, and the vibrations were measured at two positions or more to calculate the cross-correlation function, the result was the same as the above. That is, the cross-correlation function of data in a range of being integrated with the wrap 100 was a large value of about 0.7 to 0.9. Meanwhile, the cross-correlation function of the vibration of the packages 10 integrated with the wrap 100 and the vibration of the vibrated package 10 was a small value of about 0.7 or less. It was possible to discriminate that the two packages 10 at the center were integrated (adhere) from these results, and the gripping by using the robot hand was successful. It can be seen from the above that the parameters such as the weight, the gravity center, the number of packing matters, the adhesive condition of two or more of the contents with each other were correctly estimated through the estimation method of the embodiment.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes may be made without departing from the spirit of the inventions. The inventions described in the accompanying claims and their equivalents are intended to cover such forms or modifications as would fall within the scope and spirit of the inventions.

What is claimed is:

1. A parameter estimation method, comprising:
   acquiring appearance information including a shape information and a position information of at least one package of a plurality of packages each having a packing material and a content packed by using the packing material;
   vibrating the at least one package at least at one position selected in accordance with the appearance information, and acquiring at least one data showing a vibration of the at least one package, the at least one data being selected from the group consisting of acceleration, speed and displacement; and
   estimating a value of at least one parameter of the at least one package in accordance with a relation between the at least one data and the at least one parameter, the at least one parameter being selected from the group consisting of: a weight of the content; a weight of the at least one package; a gravity center of the content; a gravity center of the at least one package; a range of two or more of the contents integrally disposed; a range of two or more of the packages integrally disposed; an adhesive condition of two or more of the contents; and an adhesive condition of two or more of the packages.

2. The method according to claim 1, wherein
the at least one data includes:
at least one first data, being acquired by vibrating the at least one package at a first position selected in accordance with the appearance information, being selected from the group consisting of: the acceleration; the speed; and the displacement, and showing the vibration of the at least one package; and
at least one second data, being acquired by vibrating the at least one package at a second position selected in accordance with the appearance information, being selected from the group consisting of: the acceleration; the speed; and the displacement, and showing the vibration of the at least one package, and wherein
the value of the at least one parameter of the at least one package is estimated in accordance with a cross-correlation function of a plurality of data including the first data and the second data.

3. The method according to claim 2, wherein
the packing material has a first surface and a second surface, and
the first data is acquired at the first surface, and
the second data is acquired at the second surface.

4. The method according to claim 1, wherein
the value of the at least one parameter of the at least one package is estimated in accordance with a lookup table showing a relation between the at least one data and the at least one parameter.

5. The method according to claim 4, wherein
the at least one data is converted into a transfer function, and
the lookup table shows a relation between the transfer function and the at least one parameter.

6. The method according to claim 4, wherein
the data is converted into a transfer function after a fast Fourier transformation of the data, and
the lookup table shows a relation between the transfer function and the at least one parameter.

7. The method according to claim 1, wherein
the at least one package is vibrated by using a sonic oscillator.

8. The method according to claim 1, wherein
the at least one data is acquired by using at least one sensor selected from the group consisting of: an electrostatic capacitance non-contact displacement meter; an eddy-current non-contact displacement meter; an optical non-contact displacement meter; an ultrasonic displacement meter; and a laser Doppler vibration meter.

9. A parameter estimation device, comprising:
an imaging device to acquire appearance information including a shape information and a position information of at least one package of a plurality of packages each having a packing material and a content packed by using the packing material;
an vibrator to vibrate the at least one package at least at one position selected in response to the appearance information;
a detector to acquire at least one data selected from the group consisting of: acceleration; speed; and displacement, and showing a vibration of the at least one package; and
an estimation device to estimate a value of at least one parameter in accordance with a relation between the at least one data and the at least one parameter, the at least one parameter being selected from the group consisting of: a weight of the content; a weight of the at least one package; a gravity center of the content; a gravity center of the at least one package; a range of two or more of the contents integrally disposed; a range of two or more of the packages integrally disposed; an adhesive condition of two or more of the contents; and an adhesive condition of two or more of the packages.

10. The parameter estimation device according to claim 9, further comprising:
a storage to store a lookup table showing a relation between the at least one data and the at least one parameter.

11. The parameter estimation device according to claim 9, wherein
the vibrator includes a sonic oscillator.

12. The parameter estimation device according to claim 9, wherein
the detector includes at least one selected from the group consisting of: an electrostatic capacitance non-contact displacement meter; an eddy-current non-contact displacement meter; an optical non-contact displacement meter; an ultrasonic displacement meter; and a laser Doppler vibration meter.

* * * * *